Aug. 25, 1959 — J. W. DICKEY — 2,901,185
DAMPENED PINTLE NOZZLE
Filed April 19, 1956

INVENTOR.
JOHN W. DICKEY
BY
James L. O'Brien
ATTORNEY

2,901,185

DAMPENED PINTLE NOZZLE

John W. Dickey, Wood-Ridge, N.J., assignor to Bendix Aviation Corporation, South Bend, Ind., a corporation of Delaware Application April 19, 1956, Serial No. 579,286

3 Claims. (Cl. 239—453)

This invention relates generally to nozzles and more particularly to nozzles of the variable area type.

Nozzles embodying the present invention are adapted for installation in fuel manifolds of gas turbine or ram jet engines. In such installations a single manifold is provided with a plurality of nozzles for supplying fuel to a combustion chamber or a plurality of combustion chambers. Each of the nozzles is provided with a valve to vary the area of a nozzle discharge orifice in response to variations in the manifold fuel pressure. When the engine is operating severe vibrations are set up in the fuel manifold due to pump pulsations, combustion and engine vibrations. These vibrations in turn cause vibratory movement of the valves which results in poor fuel delivery, valve breakage and general instability. If a valve breaks an excessive quantity of fuel is delivered to the combustion chamber creating a hot spot which may set up severe thermal stresses sufficient to cause engine failure.

It is accordingly an object of the present invention to provide in a valve controlled nozzle for a fuel manifold a means for eliminating or reducing valve vibration.

It is a further object of the present invention to provide means for eliminating or reducing nozzle valve vibration which is compact and which may be readily and inexpensively manufactured.

Other objects and advantages of the present invention will be readily apparent during the course of the following description, reference being had therein to the accompanying drawings in which.

Figure 2:
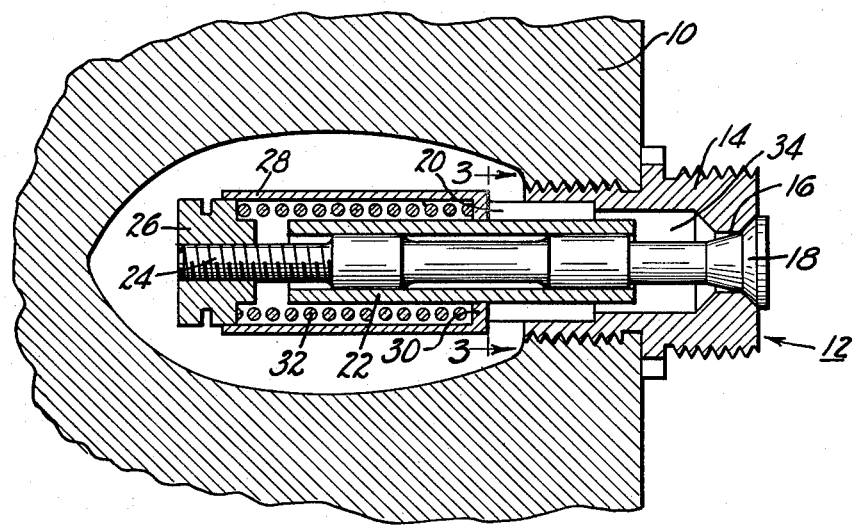
Figure 2 is an enlarged cross sectional view taken along line 2—2 of Figure 1.
Figure 3:
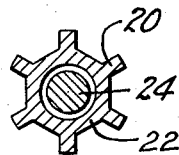
Figure 3 is a cross sectional view taken along line 3—3 of Figure 2.
Figure 1:
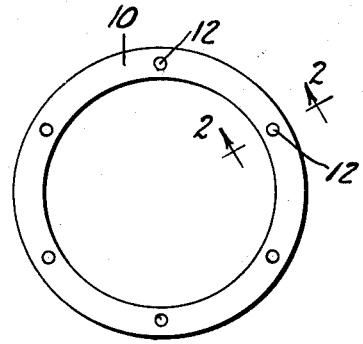
Figure 1 is a view of a fuel manifold for a gas turbine engine showing the nozzles of the present invention in operative position.

Referring now to the drawing, numeral 10 designates a fuel manifold and 12 the nozzles embodying the present invention mounted therein. Each nozzle is provided with a housing or body 14 having an outlet or discharge orifice 16. A valve 18 is adapted to seat in orifice 16 to control the flow therethrough. Housing 14 communicates with manifold 10 through a channeled inlet member 20 having a guide member or sleeve 22 formed integrally therewith. A stem 24 formed on valve 18 is reciprocably disposed within sleeve 22 and is threaded at one end to receive a piston member 26 which is reciprocable within a cylinder or outer sleeve 28. Cylinder 28 is formed at one end with a turned over or flange portion 30. A spring 32 is located to encircle sleeve 22 and to engage piston 26 and flange 30 so as to urge the latter into abutting engagement with the channeled inlet member 20.

Valve 18 is openable under the influence of the pressure of fuel in manifold 10 acting in opposition to spring 32. The closing force of spring 32 may be varied by adjusting the position of piston 26 on stem 24.

Piston 26 and cylinder 28 form a compact dashpot arrangement to reduce or eliminate valve vibrations that might be set up due to fuel vibration in the manifold. The amount of dashing action is controlled by varying the clearance between piston 26 and cylinder 28. The channeled inlet member 20 is located between the cylinder 28 and the outlet 16 so that the flow capacity through the nozzle conduit 34 is independent of the clearance between piston 26 and cylinder 28.

While I have described my invention in its preferred form, it is to be understood that the same is susceptible of modification in various particulars without departing from the spirit or scope of the invention or sacrificing any of its advantages.

I claim:

1. A nozzle comprising a housing, an inlet and an outlet in said housing, a conduit connecting said inlet and said outlet, a sleeve in said inlet spaced from the walls of said conduit, a valve in said outlet, a stem formed on said valve reciprocably disposed in said sleeve, said valve controlling the flow through said outlet, a cylinder surrounding a portion of said sleeve, an inwardly turned flange formed on one end of said cylinder, a piston operatively connected to said stem exteriorly of said sleeve adapted to coact with said cylinder to retard vibration of said valve and a spring in said cylinder adapted to engage said piston and flange to urge said valve toward closed position.

2. In a nozzle for a gas turbine engine having a fuel manifold, a housing adapted for connection to said manifold, an inlet and an outlet in said housing, a valve in said housing adapted to control the flow through said outlet, a stem connected to said valve, a cylinder in said manifold surrounding at least a portion of said stem in spaced relation thereto, and a piston connected to said stem slidably disposed in said cylinder and coacting therewith to form a dashpot to retard the vibratory movements of said valve.

3. A nozzle comprising a housing having an inlet and an outlet, a sleeve in said housing disposed in axial alignment with said inlet and outlet, a valve controlling the flow through said outlet, a stem formed on said valve and being reciprocably disposed in said sleeve, a cylinder surrounding at least a portion of said sleeve and being in engagement at one end thereof with said sleeve anterior to said inlet, and a piston operatively connected to said stem and coacting with said cylinder to retard vibratory movement of said valve.

References Cited in the file of this patent

UNITED STATES PATENTS

| 1,296,614 | Blakely | Mar. 11, 1919 |
| 1,754,936 | Chorlton | Apr. 15, 1930 |
| 2,096,581 | Goldberg | Oct. 19, 1937 |
| 2,433,985 | Fodor | Jan. 6, 1948 |
| 2,537,054 | Hildestad | Jan. 9, 1951 |
| 2,592,111 | Bischof | Apr. 8, 1952 |

FOREIGN PATENTS

| 20,758 | Great Britain | Sept. 20, 1911 |
| 124,179 | Great Britain | Mar. 20, 1919 |
| 100,642 | Australia | Mar. 24, 1937 |